(12) United States Patent
Bolling et al.

(10) Patent No.: US 10,789,603 B2
(45) Date of Patent: Sep. 29, 2020

(54) AT-SHELF CONSUMER FEEDBACK

(71) Applicant: The Like Machine, Inc., Northfield, IL (US)

(72) Inventors: Thomas Bolling, Northfield, IL (US); John Farrar, Eldorado Hills, CA (US)

(73) Assignee: THE LIKE MACHINE, INC., Northfield, IL (US)

( * ) Notice: Subject to any disclaimer, the term of this patent is extended or adjusted under 35 U.S.C. 154(b) by 603 days.

(21) Appl. No.: 14/918,251

(22) Filed: Oct. 20, 2015

(65) Prior Publication Data

US 2016/0110740 A1  Apr. 21, 2016

Related U.S. Application Data

(60) Provisional application No. 62/066,214, filed on Oct. 20, 2014.

(51) Int. Cl.
*G06Q 30/02* (2012.01)

(52) U.S. Cl.
CPC ................. *G06Q 30/0203* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 5,279,882 A | 1/1994 | Daude et al. | |
| 5,519,608 A | 5/1996 | Kupiec et al. | |
| 5,606,602 A | 2/1997 | Johnson et al. | |
| 5,640,193 A | 6/1997 | Wellner | |
| 5,673,322 A | 9/1997 | Pepe et al. | |
| 5,721,421 A | 2/1998 | VanDonkelaar | |
| 5,732,074 A | 3/1998 | Spaur et al. | |
| 5,854,624 A | 12/1998 | Grant | |
| 5,913,210 A | 6/1999 | Call | |
| 5,938,727 A | 8/1999 | Ikeda | |
| 5,950,173 A | 9/1999 | Perkowski | |
| 5,971,277 A | 10/1999 | Cragun et al. | |
| 5,978,773 A | 11/1999 | Hudetz et al. | |
| 5,979,757 A | 11/1999 | Tracy et al. | |
| 5,992,752 A | 11/1999 | Wilz et al. | |
| 6,101,478 A * | 8/2000 | Brown ................. | A61B 5/0002 705/2 |
| 6,134,548 A | 10/2000 | Gottsman et al. | |
| 6,233,564 B1 | 5/2001 | Schulze, Jr. | |
| 6,429,776 B1 | 8/2002 | Alicot et al. | |
| 6,434,530 B1 | 8/2002 | Sloane et al. | |
| 6,827,260 B2 | 12/2004 | Stoutenburg et al. | |

(Continued)

OTHER PUBLICATIONS

International Search Report and Written Opinion of the International Searching Authority in International Application No. PCT/US13/74738, dated May 9, 2014, 8 pages.

*Primary Examiner* — Kurtis Gills
(74) *Attorney, Agent, or Firm* — Loeb & Loeb LLP

(57) ABSTRACT

A system and method may include processing questionnaire data and answer data by an at-shelf display device located in a business wherein the answer data includes multiple answer selections to the questionnaire data. Questionnaire data and answer data is displayed on the at-shelf display device and answer data is selected by the consumer and received by the at-shelf display device in response to the questionnaire data. The received selected answer data selected by the consumer is aggregated.

14 Claims, 14 Drawing Sheets

(56) References Cited

U.S. PATENT DOCUMENTS

| | | |
|---|---|---|
| 7,086,584 B2 | 8/2006 | Stoutenburg et al. |
| 7,519,562 B1 | 4/2009 | Vander Mey et al. |
| 8,190,444 B2 | 5/2012 | Baudisch et al. |
| 2001/0032128 A1 | 10/2001 | Kepecs |
| 2002/0016746 A1* | 2/2002 | McHenry ............... G06Q 30/02 705/26.5 |
| 2002/0153414 A1 | 10/2002 | Stoutenburg et al. |
| 2002/0196204 A1 | 12/2002 | Senn et al. |
| 2003/0171944 A1 | 9/2003 | Fine et al. |
| 2003/0191688 A1 | 10/2003 | Prince et al. |
| 2004/0044564 A1 | 3/2004 | Dietz et al. |
| 2004/0083170 A1 | 4/2004 | Bam et al. |
| 2004/0176963 A1 | 9/2004 | Vallerand |
| 2004/0238637 A1 | 12/2004 | Russell et al. |
| 2004/0249712 A1 | 12/2004 | Brown et al. |
| 2005/0040934 A1 | 2/2005 | Shanton |
| 2005/0108082 A1 | 5/2005 | Jenkinson |
| 2005/0131752 A1 | 6/2005 | Gracie et al. |
| 2005/0198316 A1* | 9/2005 | Gold ..................... G06Q 30/02 709/228 |
| 2005/0228718 A1 | 10/2005 | Austin |
| 2006/0038009 A1 | 2/2006 | Russell et al. |
| 2006/0149628 A1* | 7/2006 | Chefalas ............... G06Q 30/02 705/14.18 |
| 2007/0290043 A1 | 12/2007 | Russell et al. |
| 2008/0004951 A1 | 1/2008 | Huang et al. |
| 2008/0011844 A1 | 1/2008 | Tami et al. |
| 2008/0011850 A1 | 1/2008 | Henry |
| 2008/0025779 A1 | 1/2008 | Henry |
| 2008/0040196 A1 | 2/2008 | Coon et al. |
| 2008/0124687 A1* | 5/2008 | Post ..................... A61B 5/16 434/219 |
| 2009/0030787 A1* | 1/2009 | Pon ..................... G06Q 30/02 705/14.14 |
| 2009/0150217 A1* | 6/2009 | Luff ..................... G06Q 30/02 705/7.32 |
| 2010/0268661 A1 | 10/2010 | Levy et al. |
| 2010/0306024 A1* | 12/2010 | Ryan ..................... G06F 3/0482 705/7.32 |
| 2011/0159857 A1 | 6/2011 | Faith et al. |
| 2011/0234514 A1* | 9/2011 | Gothard ............... G06Q 30/02 345/173 |
| 2012/0208165 A1 | 8/2012 | Levaniemi et al. |
| 2012/0330722 A1* | 12/2012 | Volpe ................. G06Q 30/0201 705/7.32 |
| 2014/0046869 A1* | 2/2014 | Dear ..................... G06O 30/06 705/347 |
| 2014/0236728 A1* | 8/2014 | Wright ............... G06Q 30/0272 705/14.58 |
| 2015/0112790 A1* | 4/2015 | Wolinsky ........... G06Q 30/0238 705/14.38 |
| 2015/0356664 A1* | 12/2015 | MacKler ........... G06Q 30/0635 705/26.81 |
| 2016/0117699 A1* | 4/2016 | Tanabe ................. G06Q 30/02 705/7.32 |

* cited by examiner

AT-SHELF CONSUMER FEEDBACK

CROSS REFERENCE TO RELATED APPLICATION

This application claims the benefit of, and priority to, U.S. Prov. Appl. No. 62/066,214 filed Oct. 20, 2014, entitled "At-Shelf Consumer Feedback," the entire content of which is incorporated herein by reference.

BACKGROUND

Stores are filled with many products. Many of the products appear similar. Determining which products are desirable and which products are not desirable to a particular user is difficult to do in the confines of a retail store. Mobile phones may be able to obtain consumer review information from a remote web site but the data is often buried inside other unwanted information. In addition, using a mobile phone inside a store is a challenge as signal strength is often weak and the time required to obtain useful information can be excessive.

New products, product enhancement, and packaging enhancements are continuously being made. The success of these products and enhancements are gauged through known marketing means such as consumer surveys that are conducted through mail, internet, and other marketing efforts that are taken after the consumer completes his shopping experience.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system for providing at-shelf consumer feedback is disclosed. The system may include one or more processors and a memory containing processor-executable instructions that, when executed by the one or more processors cause the one or more processors to process questionnaire data and answer data wherein the answer data includes multiple answer selections to the questionnaire data. An at-shelf display device may display the questionnaire and answer data. The at-shelf display device may also receive selected answer data selected by consumers in response to questionnaire data. The system may also aggregate received selected answer data selected by consumers.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

DETAILED DESCRIPTION

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

A need exists to gain immediate feedback on products, in the store, at a grocery shelf, or in front of a clothing display to survey the shopper and obtain her immediate feedback. The subject technology provides a simple, quick and friendly survey at the point of decision in the store. The subject technology provides a direct line of communication from the consumer to the business. For example, if a cereal brand is about to introduce a new and improved version of a popular cereal, the cereal company can ask purchasers of the cereal directly: "what would you like most in your next bowl of cereal? More protein, more fiber, more antioxidants, or lower calories?" The consumer is presented with a simple and intuitive way to provide an answer to a multiple choice question right there in the cereal aisle of his local grocery store while purchasing his next box of cereal. The customer may respond by pressing a button on an at-shelf device or selecting a response within a mobile application. The goal of the invention is to solicit a specific response at the point of a shopping decision. The goal of the invention is to aggregate endorsement of individual communities by localizing survey information through physical, in-store accumulation of survey data. The subject technology may gather "likes" or other approval type feedback on a specific product in addition to soliciting specific response information to a question.

Figure 1:
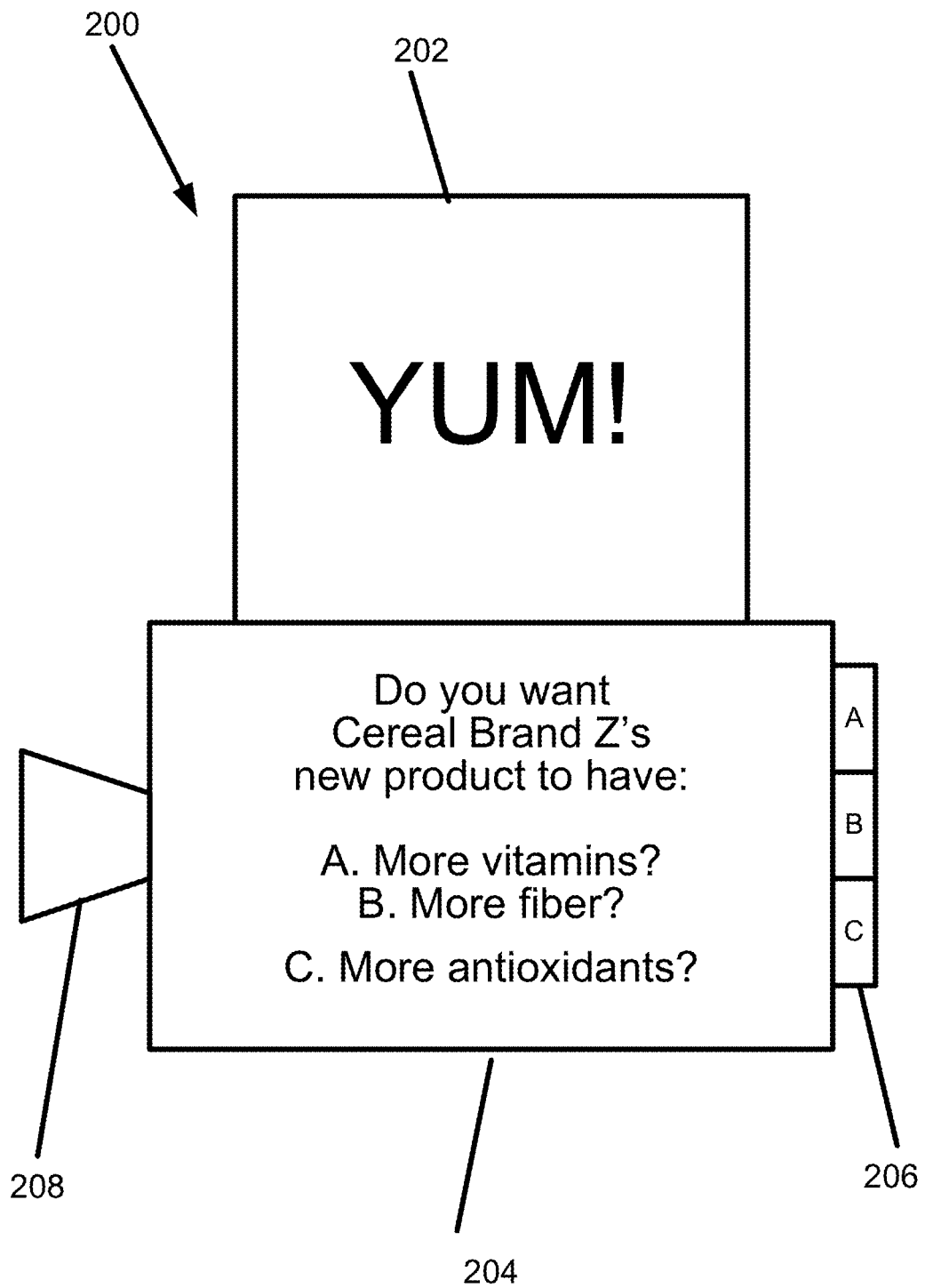
FIG. 1 is an illustration of a display.
Figure 2:
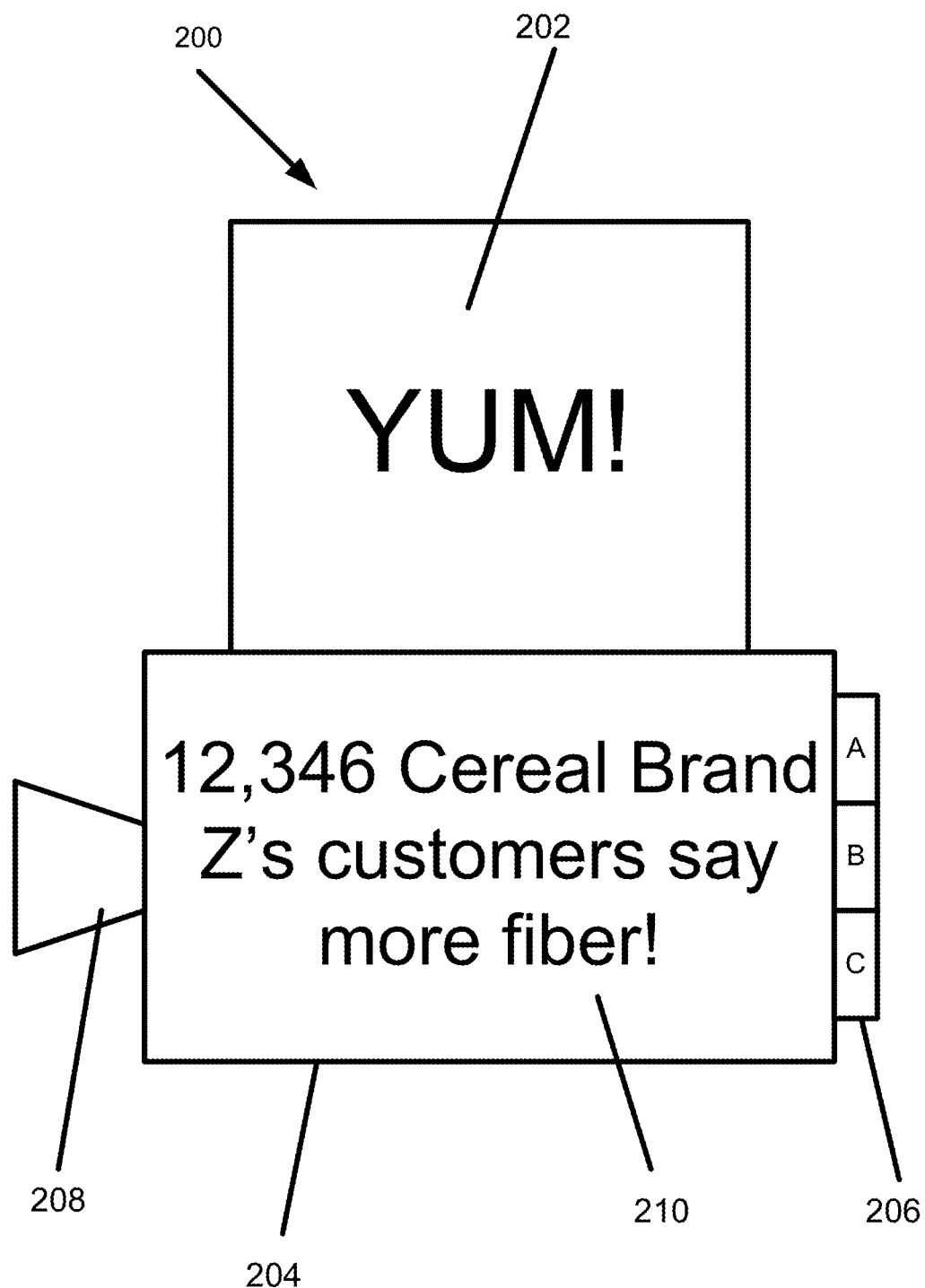
FIG. 2 is an illustration of a display with a counter.
Figure 3:
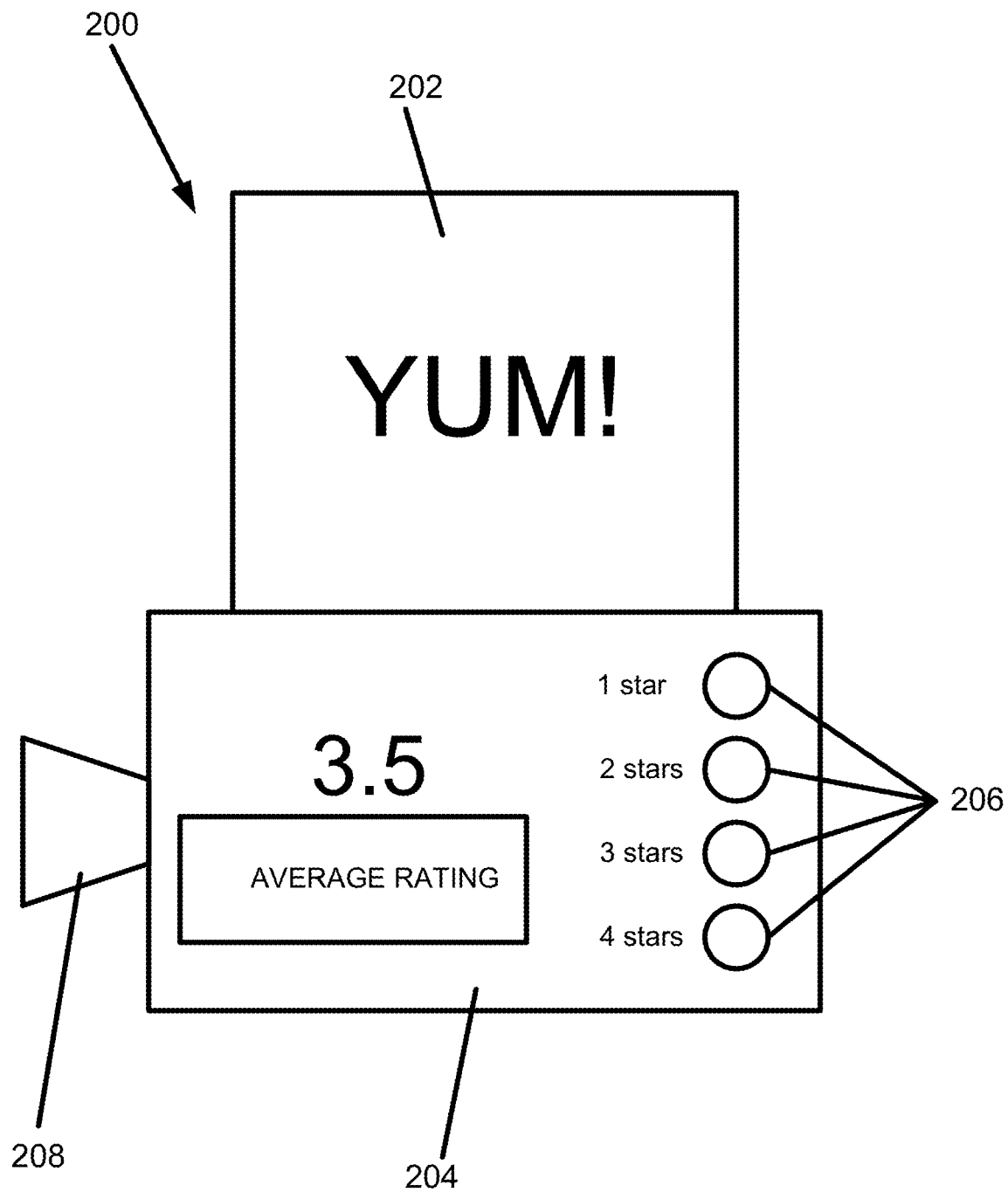
FIG. 3 is an illustration of a display.

At a high level, a display, as part of a computing system, may provide the ability to provide at-shelf consumer feedback. As a result, community based feedback can be obtained from consumers in a store right at the point where consumers are deciding between products. FIG. 1 illustrates a sample display 200. At a high level, the display 200 may have a product announcement 202, an enclosure 204 may include survey questions with multiple choice answers that may have an input buttons 206 allowing the users to select multiple choice answers "A" "B" or "C" and a support 208 that supports the display 200 in an attractive and secure manner. Enclosure 204 may be a touch sensitive display that allows a user to select a multiple choice answer by interacting with display 200 (not shown). The display may be in communication with a processor 150, a memory 165 and an input/output circuit 175 such as those illustrated in FIGS. 10 and 11 and the processor 150 may be physically configured according to computer executable instructions to count the number of times the inputs 206 are actuated in an acceptable amount of time. User may actuate the inputs 206 to indicate a level of "degree" in response to questions presented on the product announcement 202. One or more counters 210 (FIG. 2) may display the number of responses to the survey, and may display the winning results. As a result, users may quickly see the results of the survey which may encourage the customer to participate as well as inform the customer of the community's interests.

Referring to FIG. 1, the display 200 may have a variety of shapes. In some embodiments, the display 200 is shaped to be eye-catching such as a star or shaped as a stop sign. In other embodiments, the display 200 may be shaped in a manner that may be mounted right side up and upside down. In some embodiments, the display 200 may be shaped in a manner to not interfere with the process of restocking shelves and allow carts to pass without interference. For example, while a large display 200 may garner desired attention, it may interfere with carts in the aisle. In some embodiments, the display 200 may be round to stand out from the linear arrangement of most stores. Display 200 may be shaped in line specially for the product or company such that product and/or company recognition is instantaneous based on the shape of the display.

Referring briefly to FIG. 13, some possible implementations are illustrated. In some embodiments, the display 200 has active feature on more than one side, such as counters 210 and inputs 206 on opposite sides. In other embodiments such as in FIG. 13*f*, there may be a single counter 210 and input 206. In some embodiments, the display 200 is a stark white to stand out from the many bright colors in a store. In other embodiments, a variety of colors may be used as may be appropriate for the environment and the product.

The display 200 may be created from a variety of materials so long as the material is sufficiently durable to withstand the repeated use, light enough to be supported with extreme support measures being required and is appropriate for the environment. For example, the display 200 could be made from lead but lead is unnecessarily heavy and could be toxic if it rubbed off on the hands of users. In contrast, a plastic that is light, durable, eye catching and sturdy may be appropriate.

In some embodiments, the display 200 may be made up of one or more modular pieces. Referring briefly to FIG. 14, in one embodiment, there may be a frame 1400 in which the different modules 1405 lock into place. In another embodiment, the modules 1405 may not need a frame 1400 but may lock into each other. As illustrated in FIGS. 14*a*-14*d*, the modules 1405 may be arranged in a variety of orders. In some embodiments, there may be two modules 1405 and in other embodiments, there may be three or more modules 1405. The modules 1405 may connect together in a variety of known secure manners such as twist-to-lock, snap fit, bolts, clips, etc.

Figure 4:
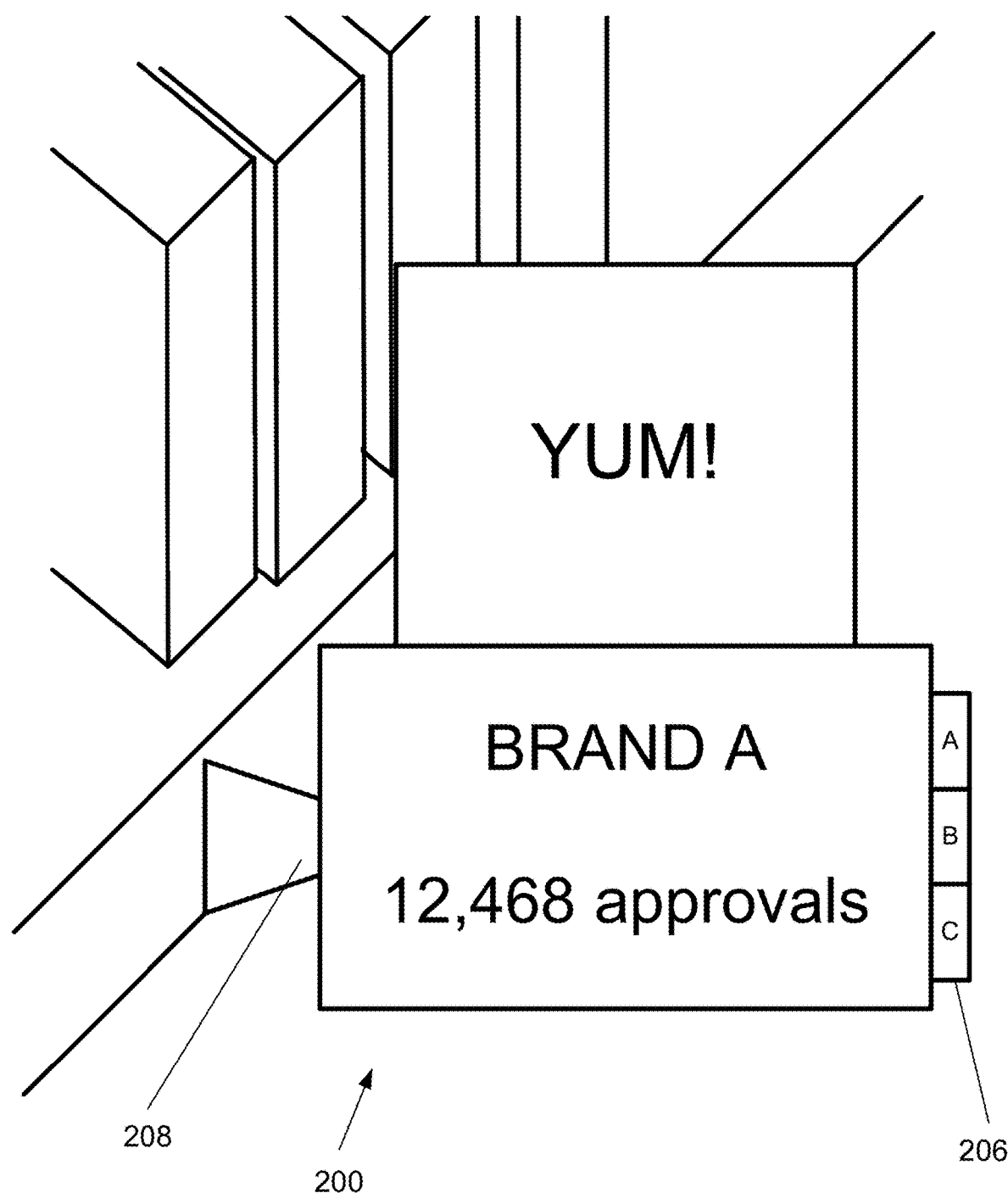
FIG. 4 is an illustration of a display in communication with a shelf in a store.

Referring again to FIG. 1, the support 208 for the display 200 may take on a variety of forms depending on the environment in which the display 200 is used. In some embodiments, the display 200 may be attached directly to a shelf in a retail environment, such as a grocery store. The support may release-ably lock into place such as illustrated in FIG. 4. In this embodiment, the display 200 may be in a relatively close location or adjacent to the product being advertised.

Figure 5:
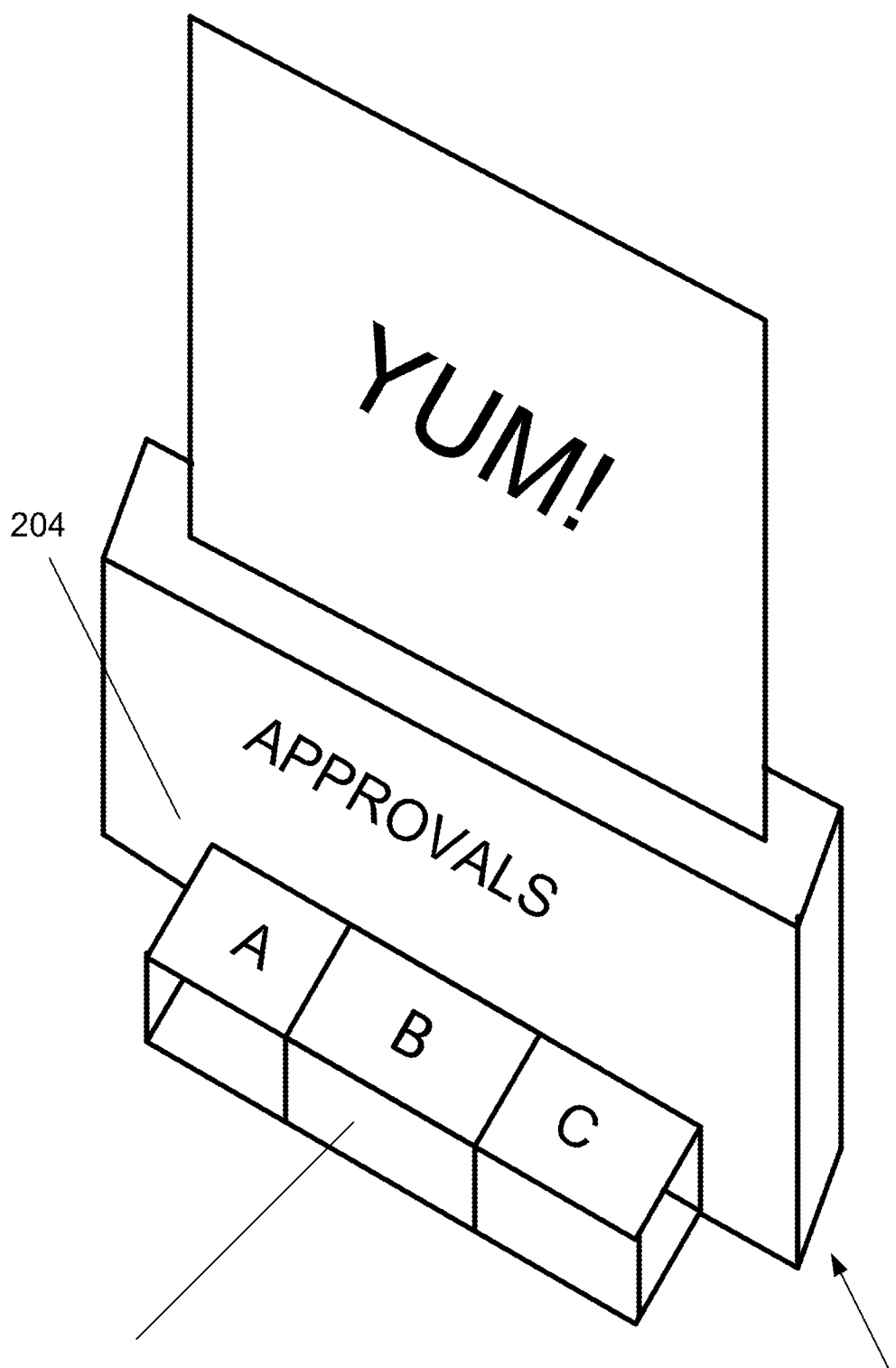
FIG. 5 is an illustration of a display in a tabletop bracket.
Figure 6:
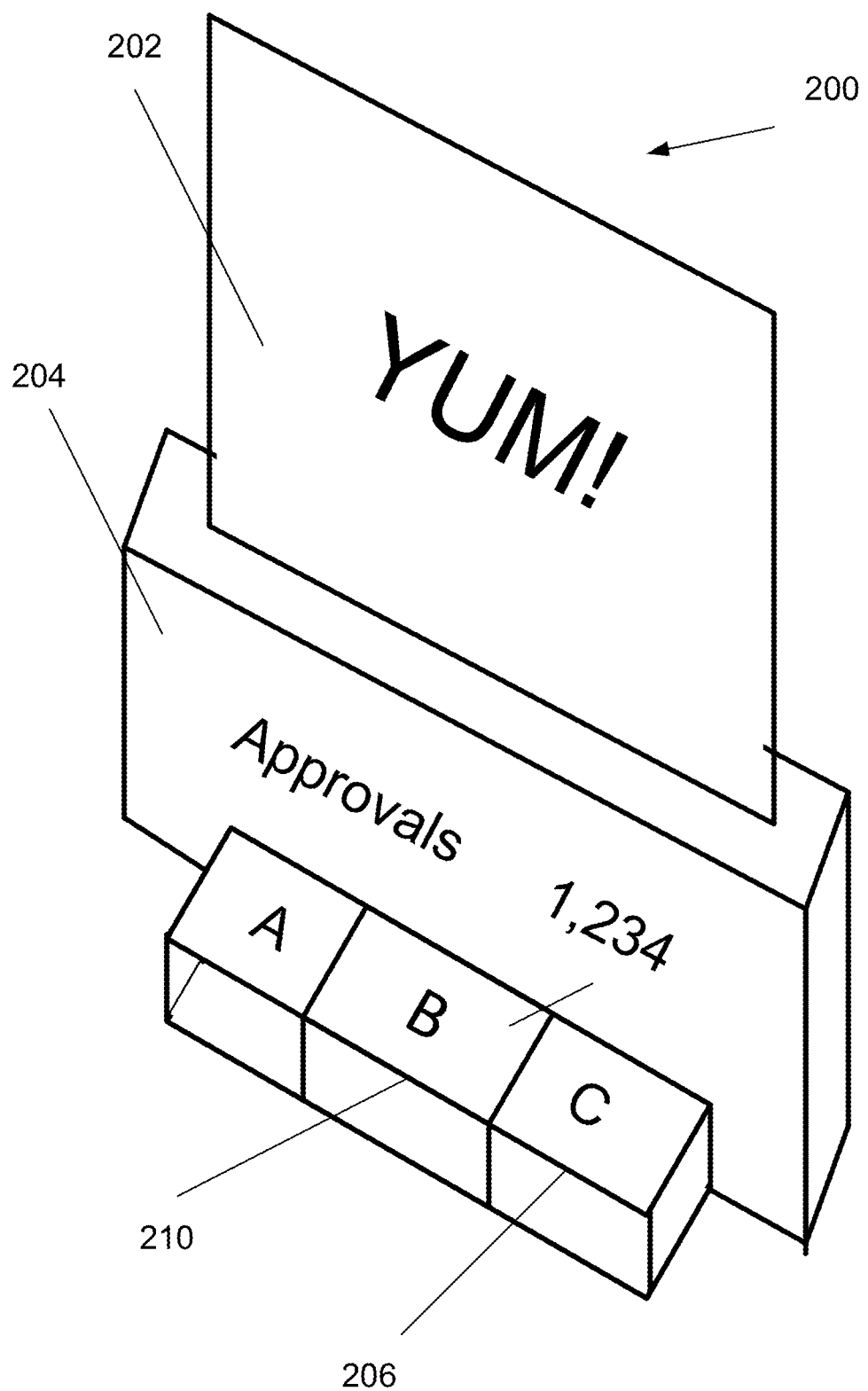
FIG. 6 is an illustration of a display with a counter in a tabletop bracket.
Figure 7:
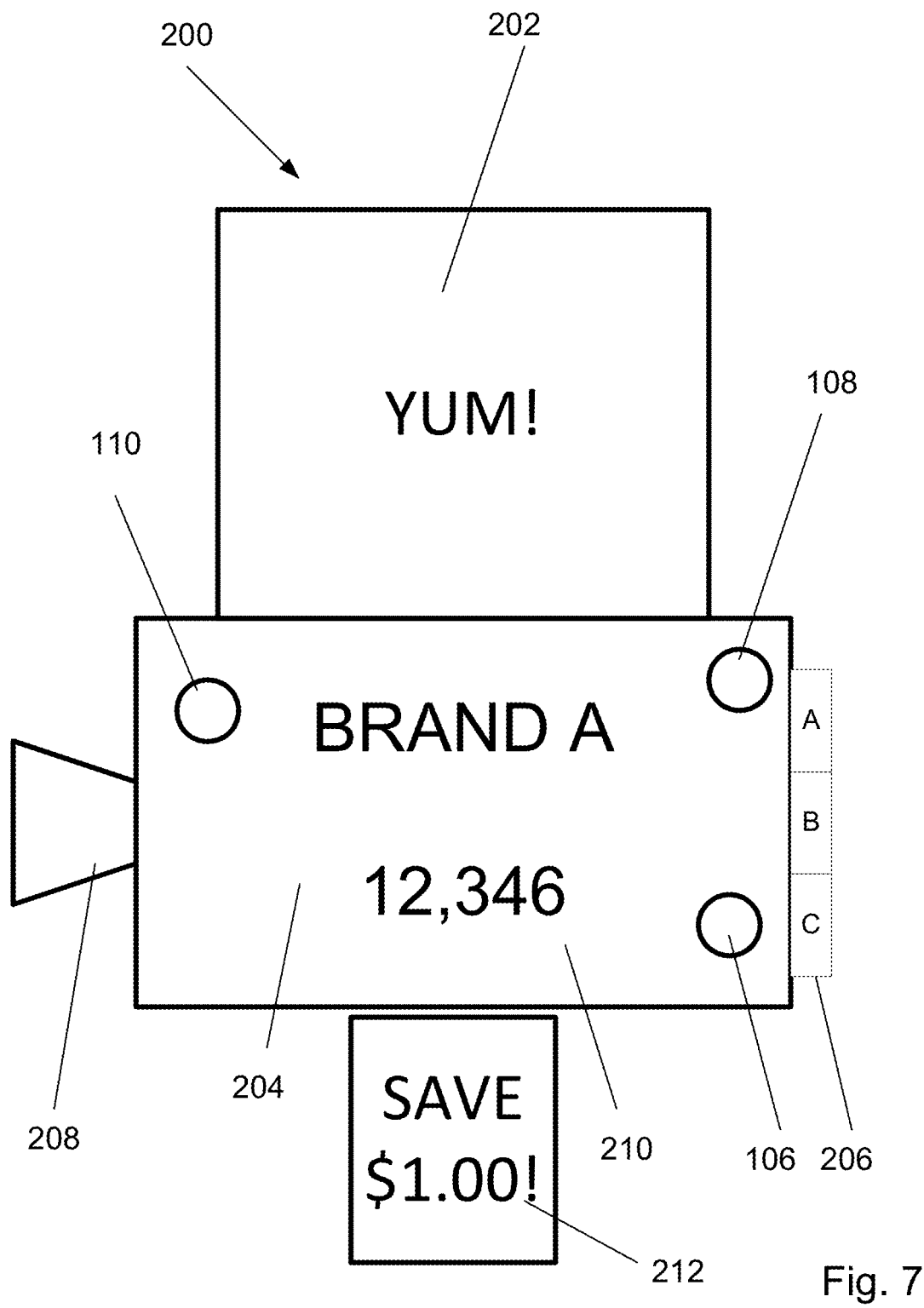
FIG. 7 is an illustration of a display with a counter, a microphone, an image sensor, a speaker and a coupon dispenser.

In other embodiments, the support 208 may take the form of a stand such as when the product is being displayed on a flat surface, such as a table as illustrated in FIGS. 5 and 6. The support 208 may be made from any material that is sufficiently sturdy to support the product announcement 202 and enclosure 204. In some embodiments, the support 208 may have a connection to the display 200 in a manner that allows the display 200 to be connection in a supported manner or in a hanging manner. For example, the support 208 may have a slot (not shown) and the display 200 may have a corresponding protuberance from which the display 200 may be supported or hung in a secure manner. In addition, a screw or other securing device may be used to secure the display 200 from slipping out from the support 208. In tabletop versions of the display 200, support 208 may be located under input buttons 206, or integral with display 204.

In some embodiments, the support 208 may be multiple pieces. For example, a first support piece 208A may hold the announcement 202 and second support piece 208B may connect to a surface. The surface to be connected to may be vertical, horizontal or a variety of angles and shapes and the support piece may be adapted to effectively support the announcement 202. By having the support 208 be more than one piece, additional surfaces may be used for attachment and additional orientations may be obtained.

Figure 12:
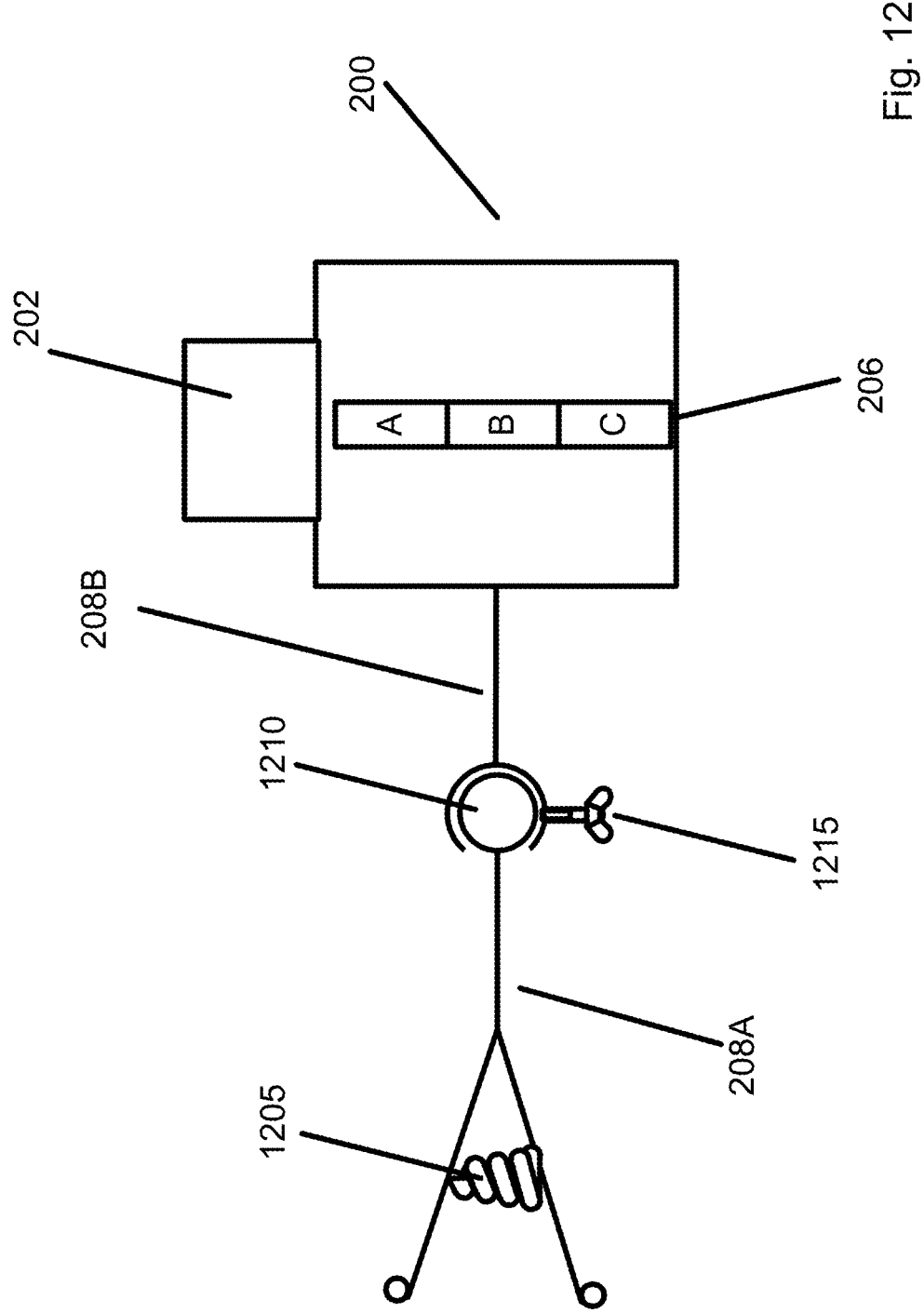
FIG. 12 is an illustration of an attachment support embodiment and orientation.

Referring briefly to FIG. 12, the first support piece 208A and the second support piece 208B may be connected in a variety of ways to ensure that the display 200 may operate in a variety of orientations, environments and situations. As one example, the first support piece 208A may have suction cups that attach to a surface such as glass on a refrigerated door. In yet another embodiment, the first support piece may be a spring loaded clamp 1205 that attaches to a variety of surfaces. In yet another embodiment, the first support piece 208A may be adapted to be in secure communication with the shelves in a grocery store which may have ridges, folds and contours which may be adapted to be in communication with the first support piece 208A. In addition, store shelves may have holes which may be used to bolt the first support piece 208A to the shelf in a secure manner. Further, a clamp like arrangement with a screw which may be thumb tight-enable may be used to secure the first support piece 208A to the shelf.

In some embodiments, the orientation of the first support piece 208A and the second support piece 208B can be adjusted such that the announcement may remain vertical. In one embodiment, the first support piece 208A and second support piece 208B are connected by a knuckle type connector 1210 and the knuckle connector 1210 may be tightened by using a screw 1215. In yet another embodiment (not shown), the first support piece 208A may be connected to a first disk and the second support piece 208B may be connected to a second disk where the first and second disk may be tightened such that the any orientation between the first and second disk may be obtained. In addition, the disks may pivot in relation to the first support piece and second support piece which may add further orientation options. Of course, the connection may be created in a variety of ways, all of which are contemplated as being part of the display 200.

A power source 155 (FIG. 10) may be included in some embodiments of the display 200. In an example, the display 200 may be an at-shelf display device that includes a processor 150, memory 165, counter 210, timer, and other electronic components. The power source 155 may power the processor 150, the memory 165, the counter 210, a timer, etc. In some embodiments, the power source 155 may be a battery that is stored inside the display 200. In other embodiments, the power is supplied from a remote power source such as a remote transformer that may supply power to a variety of devices. In yet another embodiment, a solar cell, which may be powered from overhead lighting, may be used as the power source 155. In addition, a group of solar cells may be used to power one or more displays 200. In addition, the solar cells may be in communication with a battery or one or more capacitors which may store and evenly distribute power.

The processor 150 may be in communication with the power source 155 and the memory 165. The processor 150 may be any appropriate processor 150 that can perform the desired tasks and operate on the available power without drawing too much power to prematurely drain the power source 155. The processor 150 may be local to the display 200 or may be remote and may communicate signals back and forth to the display 200.

Inputs 206 may be in communication with the input/output circuit and operably a user to indicate a user response. The inputs 206 may be virtually any shape. The input may be a button that draws user attention. In some embodiments, the inputs 206 may be a light beam that is broken as an input. In another embodiment, the inputs 206 may be a touch screen that registers contact.

In yet another embodiment, the inputs 206 may be voice activated. As an example, a user may state the answer into a microphone 106 on the display 200. The sound may be analyzed to determine if "A" "B" or another keyword was communicated. If the keyword was understood, a default may be registered.

In yet another embodiment, the inputs 206 may be a motion of a user captured by an image capturing device. As an example and not limitation, a user may make a "thumbs up" gesture which may be captured by the image capturing device 108. The image may be analyzed and if the gesture is an acceptable gesture, a response may be registered. Similarly, a microphone 108 may be in communication with the processor 150 and the inputs 206 may be spoken. For example, a user may state his response near a microphone 108, the sound may be recorded and analyzed, and, if the sound is sufficiently similar to one of the responses, it may be used as the inputs 206. In some embodiments, part of the display 200 may pivot allowing a user to register inputs 206. In an example, the inputs 206 may be motions similar to pulling up or down a slot machine lever or motions similar to using a joystick. In another embodiment, the display 200 may be shaped like a "thumbs up" and "thumbs down" and a handshake motion may register as the inputs 206. Of course, simple presses, clicks and the like are contemplated as inputs 206 also.

The processor 150 may also execute a timing operation. The timing operation may ensure that a user cannot repeatedly select the inputs 206 in rapid succession. As the inputs 206 is supposed to indicate responses from individual users, the timer may ensure that a single user cannot register numerous inputs to the inputs 206. For example, a child may find it amusing to repeatedly press the inputs 206 and see the counter 210 increase. As a result of the timer, only one responses inputs 206 may be accepted. In another embodiment such as when an image sensor 108 is part of the display 200, the images captured by the image device may be reviewed to ensure the input is from a distinct user, and if the user is distinct, the input may be counted as a response. If the input action is not from a distinct user, the input action may not be an acceptable input and the actuation of the inputs 206 may not be counted.

The cumulative counter 210 may be communication with the processor 150 and may track the number of acceptable inputs. The counter 210 may display the acceptable number of inputs 206 during a given time period. The number may be stored locally or may be stored remotely. In some embodiments, the number is stored locally and is collected periodically to be reported to a central server 141 for tracking purposes. In other embodiments, the number may be promptly communicated to a remote computing device 141. In some embodiments, there may a first counter 210 that tracks a first count, such as inputs 206 during a first period and a second counter 210 that tracks a second count such as of inputs 206 during a second period where the first period and second period are different periods of time. As an example, a first counter 210 may keep track of inputs 206 during a single day and the second counter 210 may keep track of inputs 206 for a week. In yet another embodiment, the first counter 210 may track inputs 206 at a first location and the second counter 210 may track inputs 206 over a wider geographical area such as in a state, a country, a county, etc. Of course, there may be additional counters 210 which may represent additional time periods, different geographical areas, etc.

The product announcement 202 may take on a variety of eye catching forms. In some embodiments, the product announcement 202 is a replaceable printed display, such as the logo for a product. In some embodiments, the perimeter of the product announcement 202 may be held in a frame. The frame may have sensors that enable a user to touch the announcement and have the product announcement 202 act as a touch sensitive surface, including acting as the inputs 206.

In other embodiments, the product announcement 202 may be a computer controlled display such as an LED display device or an LCD display device. If the product announcement 202 is an electronic display device, it also may be touch sensitive and act as inputs to the inputs 206. In some embodiments, the entire display 202 may act as the inputs 206 and in other embodiments, a section of the display 202 may be indicated as the inputs 206.

Another feature of the display 200 may be a digital image sensor 108 such as a camera or a scanner in communication with the processor 150. Digital image sensors 108 are commonly available and the computer executable instructions for the image sensor 108 may be local or remote. The image sensor 108 may have a variety of uses and purposes.

In one use, the digital image sensor 108 may provide images which are analyzed to ensure each input is from a unique individual. For example, a child in a red coat may repeatedly touch the inputs 206. Only one touch to the inputs 206 may be counted as an acceptable input as the inputs may need to be from distinct people. If the images confirm that the touches to the inputs 206 are from one person, only one may be counted. On the other hand, if the analysis concludes a variety of users have touched the inputs 206, each of the touches may be counted as acceptable inputs.

Acceptable inputs may be indicated in a variety of ways such as making a pleasing sound through a speaker 110 in communication with the processor 150, such as announcing "TRUE!" or "FALSE!" in a memorable manner, updating the counter 210, having the product announcement 202 flash, sequence through a series of displays, dance, sparkle or display a pleasing graphic. Similarly, unacceptable inputs such as responding "A" to a "True" "False" survey question may result in unpleasant sounds, buzzers, announcing "BONG!", or "Please try again," having the product announcement 202 display an unwanted graphic or simply go dark. In some embodiments, the microphone 108 may be used to record users speaking their responses or recording comments. In some embodiments, all inputs, whether they are touches to the inputs 206, recorded voice messages, recorded video messages, or other inputs may be stored in a memory 165 along with a time stamp, a date stamp and/or a location stamp.

In yet another embodiment, the display 200 may have a light beam and a light sensor and if a user breaks the light beam such as with a hand swipe or a foot swipe, an input may be registered. In yet another additional embodiment, the light beam may project the number of inputs on a surface, such as on the floor, making the display 200 even more attractive and useful. The light may flicker, dance, change colors, display words or images or any other image that may draw attention to the display 200.

In some embodiments, the display 200 may also have a microphone 106 that may be in communication with the processor. The microphone 106 may have several uses. In some embodiments, it may sense noise and the noise may result in the display 200 entering an awake state where the product announcement 202 is operating, the inputs 206 is ready to receive input actions and the counter 210 is displayed. Similarly, the microphone 106 may sense a lack of sound for a given period and may place the display 200 into a sleep state to conserve power. As previously noted, the microphone 106 may also accept commands for the display 200 such as accepting a variety of vocal responses as an inputs 206, "RESET" or another code word to reset the counter 210 or using voice print technology to attempt to identify a user based on the user's voice as will be further explained. A user may also have the option to record a message for the product manufacturer by making a selection on the product announcement 202 or on the display 200.

The image sensor 108 images may also be analyzed and used to notify users of the retail display functionality. For example, if no one is in the vision of the image sensor, then part of the processor that controls the inputs 206 may be shut down to save energy. Similarly, if the product announcement 202 is electronic, the announcement 202 may be shut down or enter a "sleep state" until a user is in view of the image sensor 108 to conserve energy. When a user does enter the view of the image sensor 108, the display 200 may undertake a variety of actions to draw attention to itself (enter an "awake state") such as making noise or an announcement through a speaker 110, the product announcement 208 may flash or brighten if the announcement 208 is electronic, the display 200 may spin an uneven weight to make the product announcement 208 shake, etc. Of course, the manner of drawing attention to the display 200 are numerous and varied and may be limited only by imagination.

In another aspect, the image sensor 108 images are analyzed to determine if a code is present. The code could be a bar code, a three dimensional code, a QR code, a UPC code or other relevant code that contains information. If a code is present, it may be determined if the code requires action by the device. For example, one code may be known by an authority and may reset the counter 210. In another example, the code may be for a product and a video related to the product and may be displayed on an electronic product announcement 202. A simple example may be that the sale price for the item is displayed on the product announcement for the specific user. Further, the images may be used to attempt to identify user actions such as a response or a reset action or to identify specific users as will be explained. A user may also have the option to record a video message for the product manufacturer by making a selection on the product announcement 202 or on the display 200.

In another embodiment, the display 200 may not be specifically set up for a single product but may be able to serve a variety of products. The image sensor may determine the product of interest to the user and may display information on the product announcement 208 related to the product of interest. For example, the image sensor 108 may scan a product UPC system and display information related to the product on the product announcement 202. The information may be static, may be active or even interactive. The display information may be stored locally or remotely and may be accessed through the input/output circuit 175 which may communicate with remote servers through wired or wireless communication devices.

The display 200 may also offer coupons to users. In some embodiments, the coupons are traditional paper coupons and in other embodiments, the coupons are communicated wirelessly. Further, the coupons may be offered in response to the user using the input button to input an acceptable inputs 206. In other embodiments, the display 200 may also display a price 1305 (FIG. 13a) for an item. In some embodiments, the prices 1305 displayed on the device 200 may be adjustable. The adjustment may happen in the store or may be accomplished through a network connection. The adjustment may be dynamic, such as if sales are high for an item, the price 1305 may be raised and if demand is low, the price 1305 may be lowered. Similarly, if the potential buyer is recognized either through a sensor, a card, or other manners of identification, an individual price 1305 for the buyer may be determined, displayed and stored for use at checkout, enabling instantaneous marketing of pricing for specific, recognized individuals.

The display 200 may also gather identification information from a user with permission from the user. The identification information may be gathered in a variety of ways. In one embodiment, an ID card for the user may be scanned by the image sensor 108. In another embodiment, wireless identification may be used such as by matching portable computing device wireless information with known information about a user. For example, a user may have a smart phone with Bluetooth, Wi-Fi and cellular signals and the MAC address for the smart phone may be communicated to the display 200 where the MAC address is matched to a user. Of course, near field communications may also be used to identify a portable computing device. Similarly, a smart credit or debit card with a capacitance chip may be used by the display 200 to provide information about the user.

Related, voice analysis from the microphone 106 may be used to match user voices to known voice prints of users. Similarly, the image sensor 108 may be used to attempt to identify users using facial analysis algorithms. In some advanced embodiments, the image sensor and/or touch sensors may be used to obtain a user's fingerprints for user identification purposes. In even more advanced systems, retina scans of users may be obtained. Of course, a combination of voice analysis, image analysis and other gathered data may be used together to determine the user. The identification data may be fed to a local or remote database 325 where the identification data may be quickly compared to known data to determine a user.

Once a user is identified, whether the user inputted a response may also be stored. The database may have a variety of information such as information from past purchases, buying habits, responses and previous offers. If the user is known, the user responses and purchasing habits may be analyzed to determine further actions with respect to the user. Some users may not be swayed in their purchasing decisions unless an offer is very aggressive. Other users may be swayed by less aggressive offers. As previously mentioned, by analyzing the information on the specific user, individual pricing 1305 and incentives may be created.

In some embodiments, the user may be able to communicate user input or other audio or visual inputs to other outside services such as Facebook®, Google Plus™, Twitter, blogs, emails, RSS feeds, etc. The communication preferences may be set up in advance or may be set up at the display 200 using the product announcement 202 as a keyboard for input data. In yet another embodiment, voice recognition software may allow a user to speak the necessary information to set up the outside communication preferences.

The counter 210 will continue to increase for a given period of time which may be adjustable or until the counter 210 is reset. The reset may occur in a variety of ways. In some situations, a reset button may be pressed which concealed on the display. In other embodiments, a reset code may be keyed into the inputs 206 such as three long pushes followed by three short pushes. A reset code may be announced which may be parsed by the voice recognition software and the reset action may be executed. A reset code also may be received from a remote computing device, from the image sensor or from a portable computing device. In yet another embodiment, the display 200 may be reset when the announcement 202 is removed. For example, a switch may be open when the announcement 202 is in place and the switch may close when the announcement 202 is removed which may reset the display 200.

The display 200 also may have a motion sensor and an alarm which may execute if the display 200 is removed without permission. Examples of the display alarm may be a screeching sound, a flashing light, a wired or wireless signal to an authority or the device may simply shut down permanently. Further, the display 200 may zero out the counter 210 and may clear any stored data, ensure that the data not be obtained by undesirable people. In addition, the motion sensor may be used to allow the display 200 to enter a low power or sleep mode when no motion is sensed and to enter a full power mode when motion is sensed. Logically, other sensors may be used to switch from an active mode to a sleep mode such as sound sensors, photo sensors, heat sensors, etc., as will be described further.

In other embodiments, an effort may be made to make the displays 200 tamper resistant. The display 200 may be locked to a surface using a locking type device and may only be removed with a key or code. Similarly, the display 200 may be attached using bolts or zip ties that cannot be removed without advanced tools not carried by most shoppers.

Figure 13A:
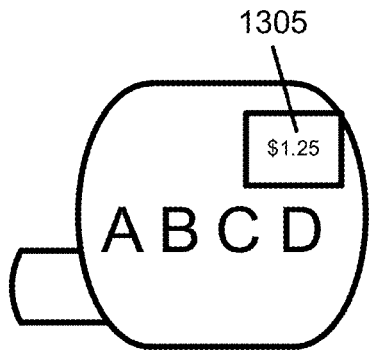
FIGS. 13*a*-13*f* are illustrations of some embodiments of the display.
Figure 13D:
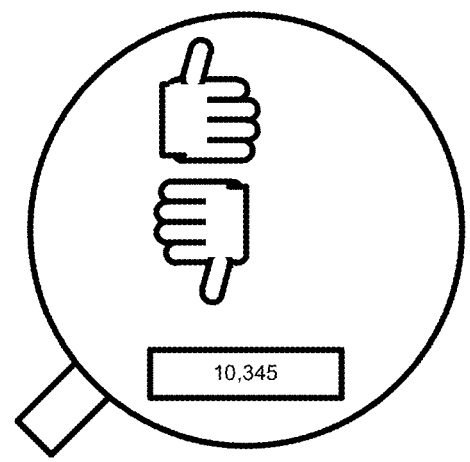
Figure 13B:
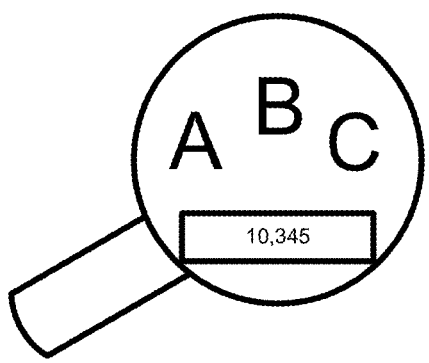
Figure 13E:
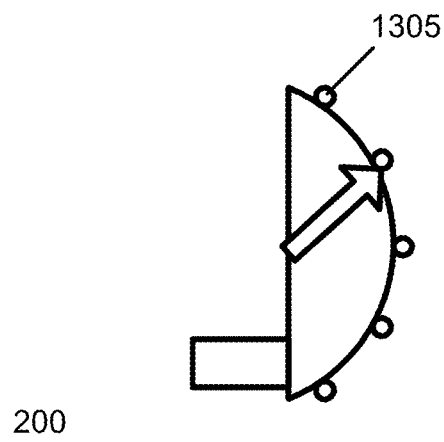
Figure 13C:
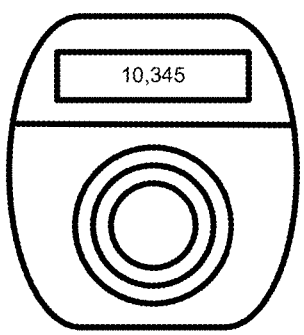
Figure 13F:
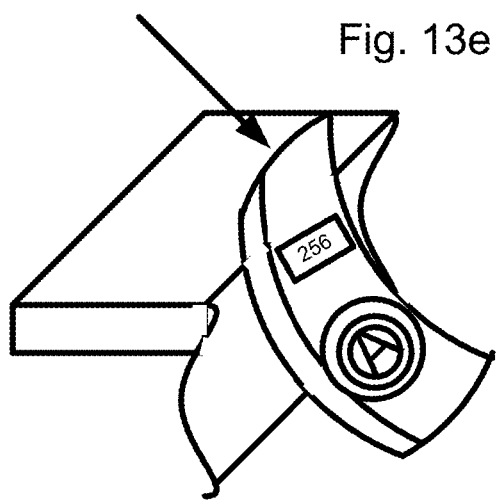
Figure 14A:
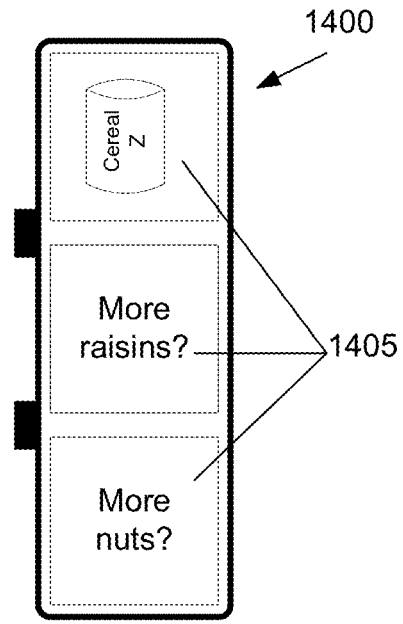
FIG. 14*a-d* are illustrations of possible modular embodiments of the display.
Figure 14B:
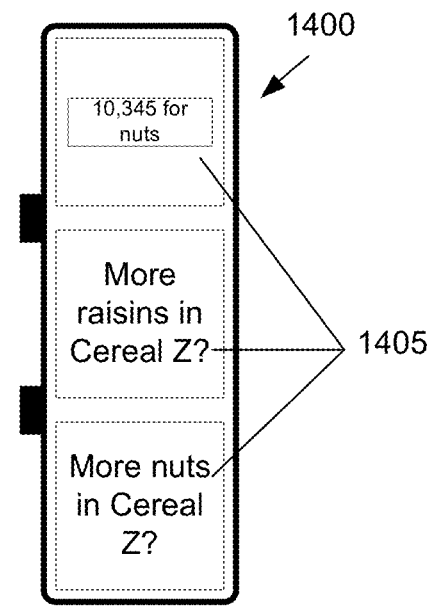
Figure 14C:
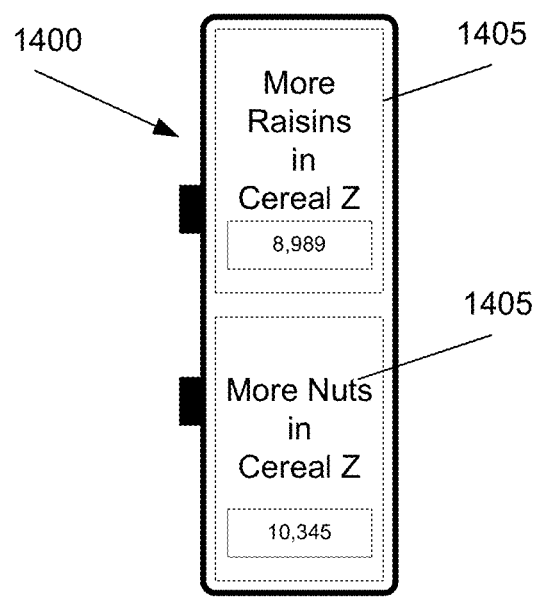
Figure 14D:
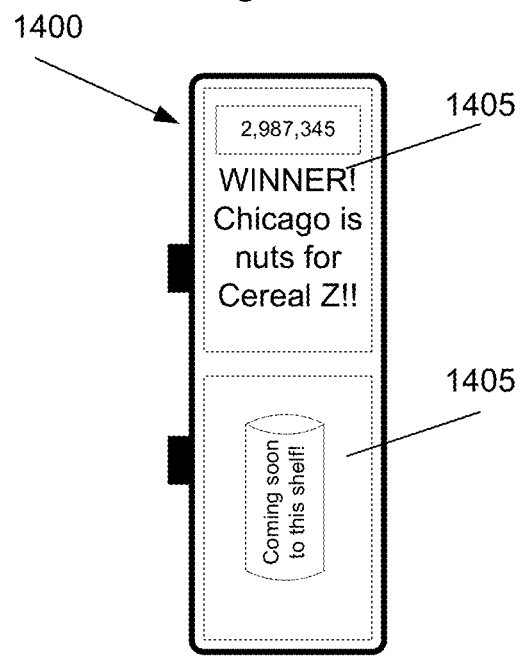

The display 200 also may provide feedback to the user in a variety of ways. In some embodiments, there may be lights designed to provide interest to the user. For example, the lights may attempt to create the illusion that inputs 206 are being wirelessly communicated such as the lights progressive lighting similar to lights on a wireless router as if the communication is leaving the display 200. Referring to FIG. 13*d*, the lights 1305 may progressively illuminate from bottom to top. The display 200 may even have a wireless antenna which may or may not be operative but may further enforce the illusion that the inputs 206 are being communicated. In another aspect, the sound of an email being sent ("whoosh") may be communicated when inputs 206 are received.

Figure 8:
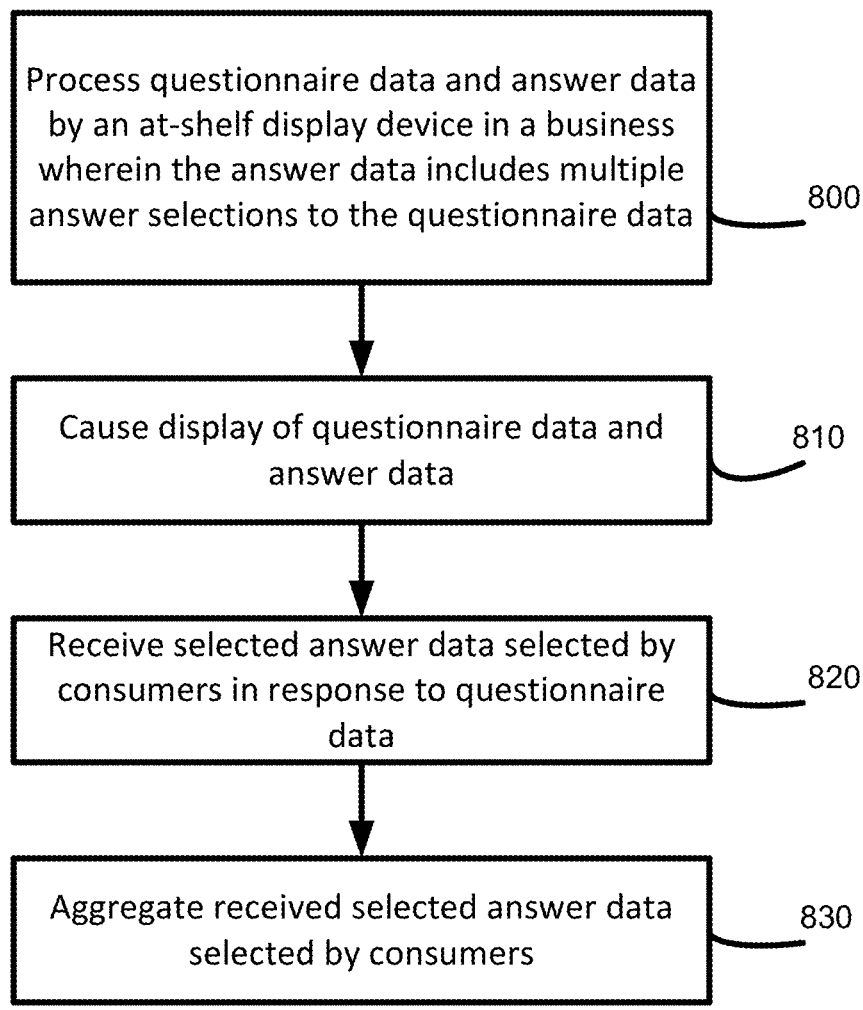
FIG. 8 is flow diagram of a method of obtaining at-shelf consumer feedback.

In another embodiment, the display 200 may be modular, having parts that can be added or removed with ease depending on the installation. Referring to FIGS. 14*a*-14*d*, A method providing at-shelf consumer feedback is shown in FIG. 8. At block 800, questionnaire data and answer data is processed by the at-shelf display device 200 with an at-shelf location in a business wherein the answer data includes multiple answer selections to the questionnaire data. The at-shelf display device 200 may be part of a client device 101, as described with reference to FIGS. 9-11. For example, the at-shelf display 200 may include a processor and memory for causing a display screen to display the questionnaire data and the answer data. The server 141 may send the questionnaire data and answer data to the at-shelf display 200. The at-shelf display 200 may process the questionnaire data and answer data and cause the display 200 to display the questionnaire data and answer data. Virtually any type of questionnaire data could be used, multiple choice questions, true false questions, thumbs up/down questions, rating type like/dislike questions, or any other variety of inquiry can be used. The term "at-shelf" as used herein encompasses its plain and ordinary meaning, including, but not limited to close proximity to goods or services within an actual business. For example, display 200 can be located on the same shelf that a product is sold in the store. The meaning of close proximity is within the same physical business location would potentially sell the subject of inquiry on the device. For example, a questionnaire inquiring about a possible new cereal physically located in the cereal aisle in a grocery would provide at-shelf consumer feedback with the device in close proximity to the goods potential sale location.

At block 810, questionnaire data and answer data is displayed on display 200 (e.g., of the client device 101). The display may be coordinated such that multiple choice answers are visually arranged in line with physical input peripherals, may be organized with letter or number associations (such as "A", "B", and "C"), or may use a touch screen display. For example, the server 141 may communicate an instruction causing an at-shelf display device 200 to display the questionnaire data and answer data. The instruction may also indicate an order in which questions on different products are to be displayed. In another example, the display 200 may automatically cause display of the questionnaire data and answer data based on stored logic.

At block 820, selected answer data is received wherein the answer data is selected by consumers in response to questionnaire data. In an example, a consumer may select one or more of inputs 206 and the display 200 may display answer data based on the selected one or more inputs 206. The display 200 may also communicate the received selections to the server 141. The server 141 may receive the selected answer data that indicates the answers selected by consumers at the display 200.

At block 830, the received selected answer data selected by consumers is aggregated. The consumer may select one of the inputs 206 to provide an answer. If a consumer presses two buttons at once, the consumer may receive a message indicating an error or requesting that the user try again. The input action may be a touch of an inputs 206, a voice command, an action or a combination of touch, voice and action. It may be determined if the inputs 206 is from a distinct user. If the inputs 206 is from a distinct user, the user that produced the input action may attempt to be determined.

If the user is determined, the user may be stored in a memory 165. The inputs 206 may be accepted and stored in a memory 165 along with the user if the user is known. A time stamp, a date stamp and a location stamp may be stored with the inputs 206. The counter 210 may be incremented. It may be determined if specific offers may be offered to the determined user. Of course, additional blocks may be added and blocks may be removed without changing the described device. Aggregation may be performed by the at-shelf display device 200 and/or at the server 141. Aggregation may include generating a statistical measure, such as, for example, determining a total number of selections of each answer, determining an average number of selections of each answer, and the like. Aggregation may also be over any amount of time or be limited to a predetermined time period (e.g., last hour, last 24 hours, week of August $5^{th}$, etc.).

The server 141 may also analyze selections input by consumers at the display 200 for assisting a retailer in making marketing and inventory-management decisions. In an example, a retailer may have stores at one or more locations (e.g., nationwide) each having one or more displays 200 included therein. The displays 200 may communicate input data corresponding to each actuation of inputs 206 to server 141 via a computer network. The input data may include one or more of product data, time and place data, and selected answer data. For example, the display 200 may communicate data indicating what product was being displayed (e.g., by a product identifier, manufacturer code for the product, etc.) when a consumer actuated at least one of the inputs 206. The display 200 may also generate time and place data about the store where the display 200 is physically located (e.g., geographic location) and the time and date when the consumer actuated one of the inputs 206. The display 200 may generate selected answer data to indicate what answer the consumer selected.

The server 141 may aggregate the input data for use by retailers and/or manufacturers in making decisions on future product assortment, product distribution, and advertising decisions. In an example, the server 141 may assist a retailer in determining which products to showcase on its website. At some time, a user may open, using a client device (e.g., smart phone, tablet computer, computer, and the like), a software application (e.g., an app) or access a website associated with a retailer. The client device may communicate a request and the server 141 may select which product(s) to present via a display of the client device. The request may include, for example, geo-location data of the requesting client device.

To determine which product(s) to showcase on the website, the server 141 may access a list of available products to promote and rank the list. The ranking may be based on the aggregated selected answer data. For example, the server 141 may determine what product features are important to consumers based on the aggregated selected answer data and score the products based on whether a product has the desirable features. The server 141 may rank the products based on their score. In an example, a score may be a function of one or more product features determined to be important based on the aggregated selected answer data. Example functions include simple addition, weighted addition, an average, a weighted average, and the like. For instance, the function may be: score=feature1*weight1+ feature2*weight2.

In some examples, the aggregated selected answer data may be associated with a particular time frame, and exclude or reduce reliance on older data. For example, the server 141 may weight the aggregated selected answer data based on its age, giving a higher weighting to more recent data (e.g., within the past 2 weeks) and a lower weighting to older data (e.g., more than 2 weeks old). Thus, the server 141 may track trends in consumer preferences and the rankings may reflect those trends.

In some instances, the server 141 may generate the scores accounting for geo-location. In an example, the server 141 may only use aggregated selected answer data that was generated by displays 200 situated within a predetermined distance of a particular geo-location. For example, the server 141 may generate the scores based on displays 200 within a particular city (e.g., New York) and exclude data from all other geo-locations.

In some instances, the server 141 may generate the scores received from displays 200 accounting for changes in rankings. In an example, the server 141 may process aggregated selected answer data to determine what products are increasing their scores and corresponding rankings over time, and those whose scores are decreasing. For example, the server 141 may determine that a first product has increased its ranking over a predetermined amount (e.g., moved up 50 spots in three days).

The server 141 may reply to a website request by communicating an image of a product having the highest ranking to the requesting client device. In some examples, the server 141 may communicate an image of products having the highest rankings (e.g., top 2 products, top 3, etc.). In other examples, the server 141 may consider changes in rankings and select an image of a product that has recently increased its ranking by at least a predetermined amount (e.g., moved from top 85% to top 55% in one week). Thus, the server 141 may help a retailer to advertise products having features that are well-liked in an app, website, or other graphical user interface. Moreover, the server 141 may control what products are displayed by the displays 200 when a consumer first approaches, and the server 141 may cause the displays 200 to display images of highly ranked products (e.g., within top 40%). The server 141 may also determine current inventory levels of a particular store and cause the displays 200 to only display highly ranked products that are currently in-stock at a particular store.

In addition to advertising, the server 141 may utilize similar concepts for assisting retailers in organizing shelf space. Using the ranking methodology described above, the server 141 may provide ranking information on a number of products currently in a store's inventory to recommend placing products having product features that are well-liked in high traffic areas of a store or other retail environment.

The server 141 may also utilize the ranking methodology for inventory management and control. In an example, the server 141 may use the product rankings and trends for automatically ordering products for delivery to certain geo-locations. For example, the server 141 may track rankings of products to control what products are kept in inventory by a store in the Kansas City area. For example, the server 141 may generate product rankings based on aggregated selected answer data received from displays 200 placed in the Kansas City area. The server 141 may also expand the dataset to include similar cities. For example, the server 141 may determine what cities are considered to be similar based on comparing aggregated selected answer data to determine what cities like the same product features in aggregate. The server 141 may maintain a listing of what products are currently in stock and quantity at a store, and/or may interface with an inventory computer system having such information.

The server 141 may determine when to reorder product based on the quantity levels, sales rate (e.g., sell three of a particular shirt per day), rankings, trends, and shipping time. For example, the server 141 may set thresholds for quantity level, sales rate, ranking, trends, and shipping time for controlling when the server 141 automatically generates an order for a product. The server 141 may automatically reorder a product when one or more of the quantity levels of the product currently in-stock falls below a predetermined number, the product has at least a certain ranking (e.g., in the top thirty-three percent), the ranking of the product is not decreasing by more than a predetermined amount, and the store is expected to sell-out of inventory in less than a predetermined amount of time based on a current sales rate. In a more detailed example, the server 141 may determine that a store has 50 units of a particular cereal brand in inventory, the cereal brand is ranked in the top twenty percent of products, sells at fifteen boxes per day, has increased its ranking from being within the top fifty percent within the past week, and ships in 2 days. Here, the server 141 automatically reorders the cereal because it meets one or more of the reorder criteria. The server 141 may also control machinery at a manufacturing facility and may automatically submit an order that instructs the machinery to fabricate the product being reordered. In some instances, the server 141 may also control a robotic system for loading the fabricated product onto pallets for shipping the product to a desired location (e.g., a warehouse or a store of a retailer).

In additional example embodiments, a retail manager may want to be kept informed on current inventory levels at one or more stores based on the rankings. To do so, the retail manager may have a manager client device 101 that is configured to communicate with the server 141 via network 121. In some instances, the manager client device 101 may or may not be in an active state. For example, the manager client device 101 may be in a sleep mode to conserve battery life. Because inventory levels may be time sensitive, the server 141 may communicate an alert when an inventory level drops below a predetermined level for a product having a sufficiently high ranking (e.g., top 20%). The alert may cause the manager client device 101 to exit the sleep mode and enter an active state. In some examples, the manager client device 101 may, in response to receiving the alert, perform one or more of the following: display the alert on a graphical user interface (GUI), display the product having low inventory and the current quantity in stock at a store and/or at one or more nearby stores, emit a sound, prompt the retail manager to reorder and/or to contact nearby stores, and/or establish a network connection for receiving additional data from the server 141 about the alert. For example, the alert may identify a nearby store having additional quantity of the product for a store experiencing a low inventory level.

The device 200 may also have a set up or configuration mode. This mode may allow the set-up of the device 200 for its intended purpose. The set up mode may be entered in a variety of ways. In one embodiment, the inputs 206 may be used in a specific sequence such as three long inputs, followed by three short inputs. In another embodiment, the configuration mode may be entered by scanning a code or image using the digital image scanner 108 from an authority. In yet another embodiment, a voice command to the microphone 106 may begin the configuration mode. In yet another embodiment, an additional computing device may be in communication with the device 200 and the additional computing device may accept an input from an authority such as a password to be sure the authority has rights to enter configuration mode.

Once in the configuration mode, the mode might allow the selection of specific device functions for a campaign. For example, a jingle may be loaded into the memory 165 for a first campaign and a second campaign may include loading specific visual cues. Further, certain functions may be required for some promotions but not others and the selection of the functions may be made during the configuration mode. Logically, the configuration may be accomplished locally such as with a hand held computing device 101 or remotely from a server 141, for example.

The examples embodiments may thus provide a technical solution to a technical challenge. Conventional systems fail to provide a mechanism for eliciting questionnaire responses while consumers are in a store and utilizing consumer feedback to assist retailers in (1) product development, (2) organizing their websites, and (3) controlling inventory.

Figure 9:
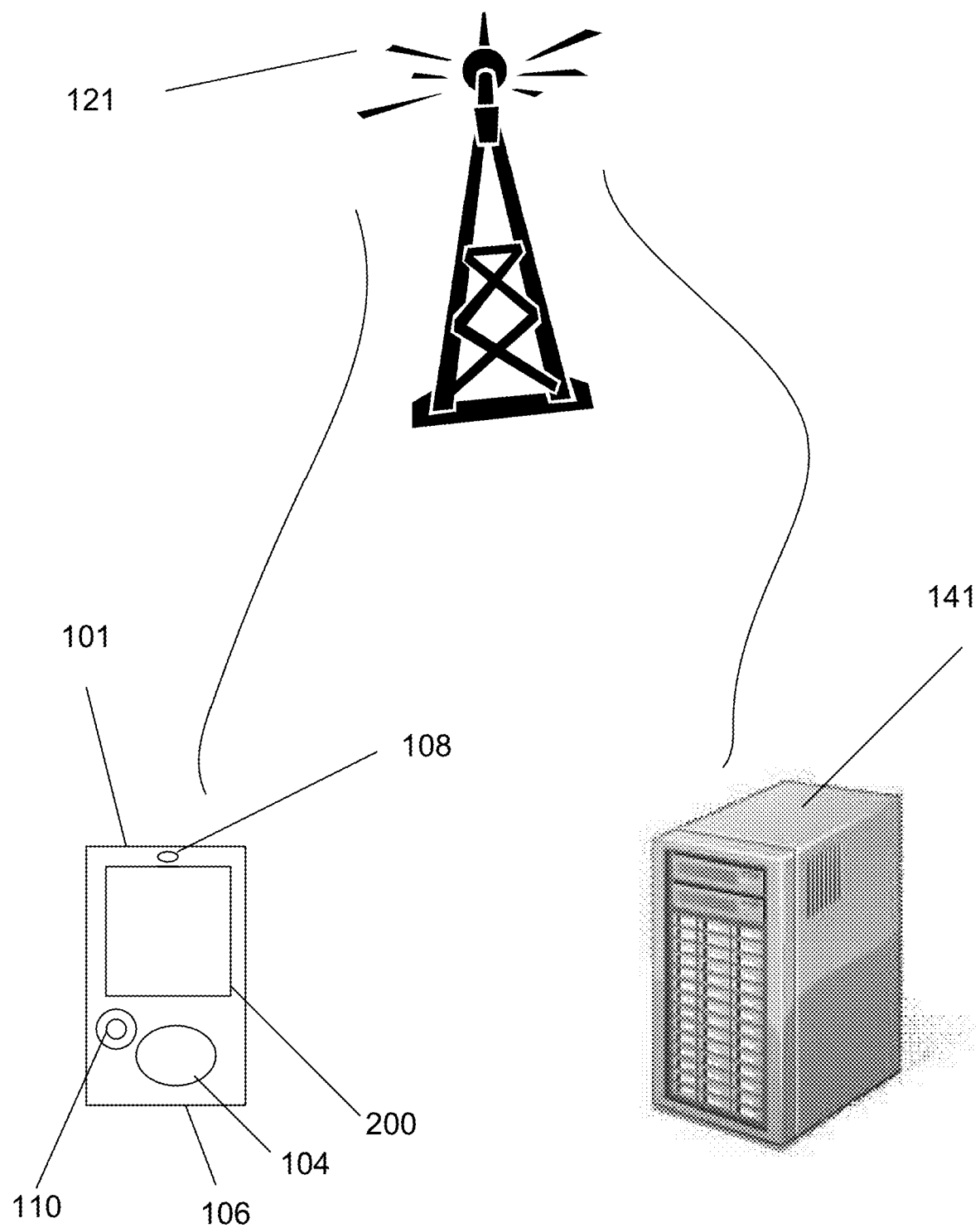
FIG. 9 is an illustration of a mobile computing device, a server type computer device and a communication device.

FIG. 9 may be a high level illustration of some of the elements a sample computing system. The computing system may be a dedicated computing device 141, a dedicated portable computing device 101, an application on the computing device 141, an application on the portable computing device 101 or a combination of all of these. FIG. 9 may be a high level illustration of a portable computing device 101 communicating with a remote computing device 141 but the application may be stored and accessed in a variety of ways. In addition, the application may be obtained in a variety of ways such as from an app store, from a web site, from a store WiFi system, etc. There may be various versions of the application to take advantage of the benefits of different computing devices, different languages and different API platforms.

In one embodiment, a portable computing device 101 may be a device that operates using a portable power source 155 such as a battery. The portable computing device 101 may also have a display 200 which may or may not be a touch sensitive display. More specifically, the display 200 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

Figure 10:
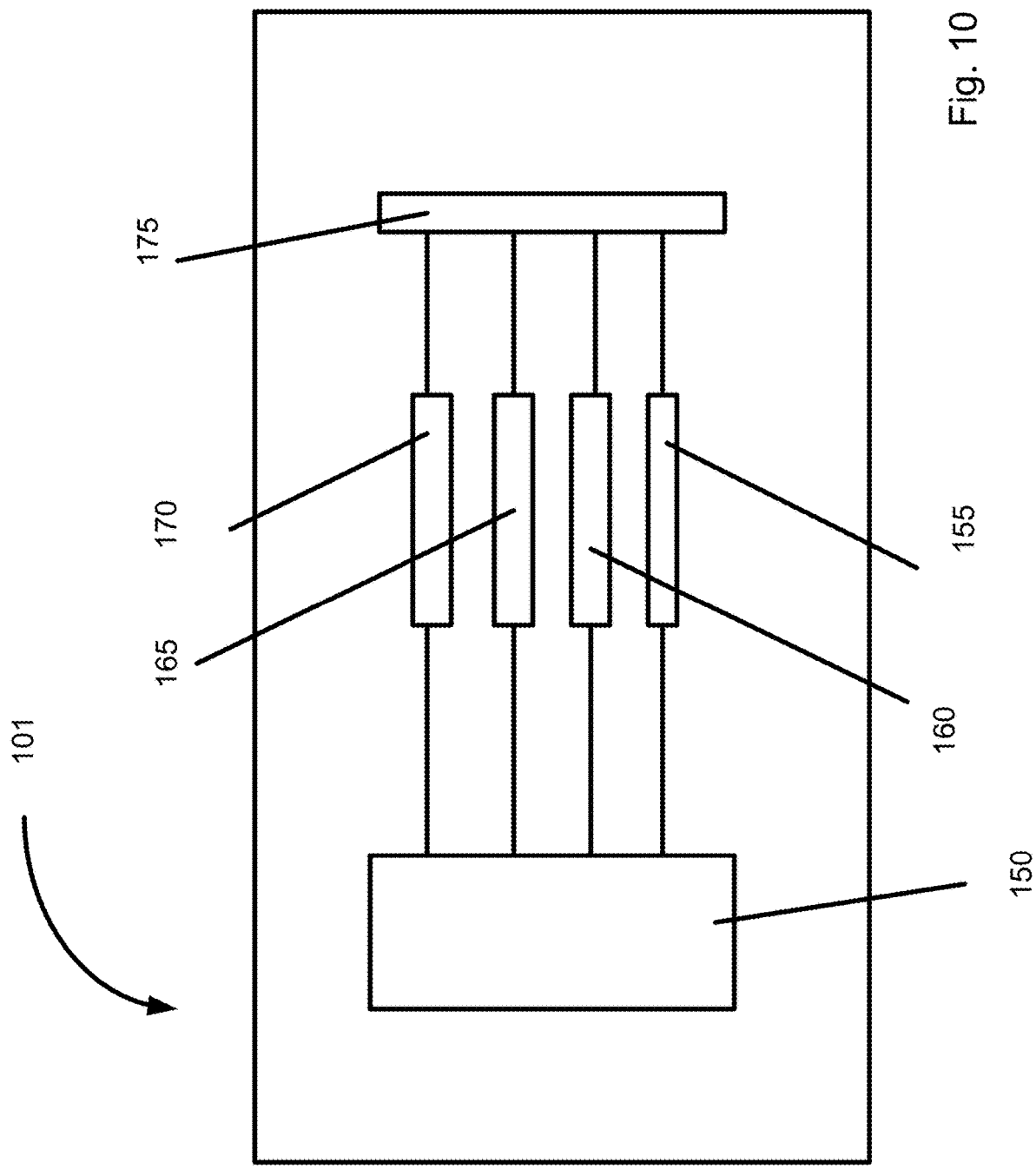
FIG. 10 is an illustration of a portable computing device.

The portable computing device 101 may be able to communicate with a computing device 141 or a plurality of computing devices 141 that make up a cloud of computing devices 111. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication network 121 such as cellular service, through the Internet, through a private network, through Bluetooth, etc. FIG. 10 may be a simplified illustration of the physical elements that make up a portable computing device 101 and FIG. 11 may be a simplified illustration of the physical elements that make up a server type computing device 141.

FIG. 10 may be a sample portable computing device 101 that is physically configured according to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 200 or may be a part of the display 200.

Figure 11:
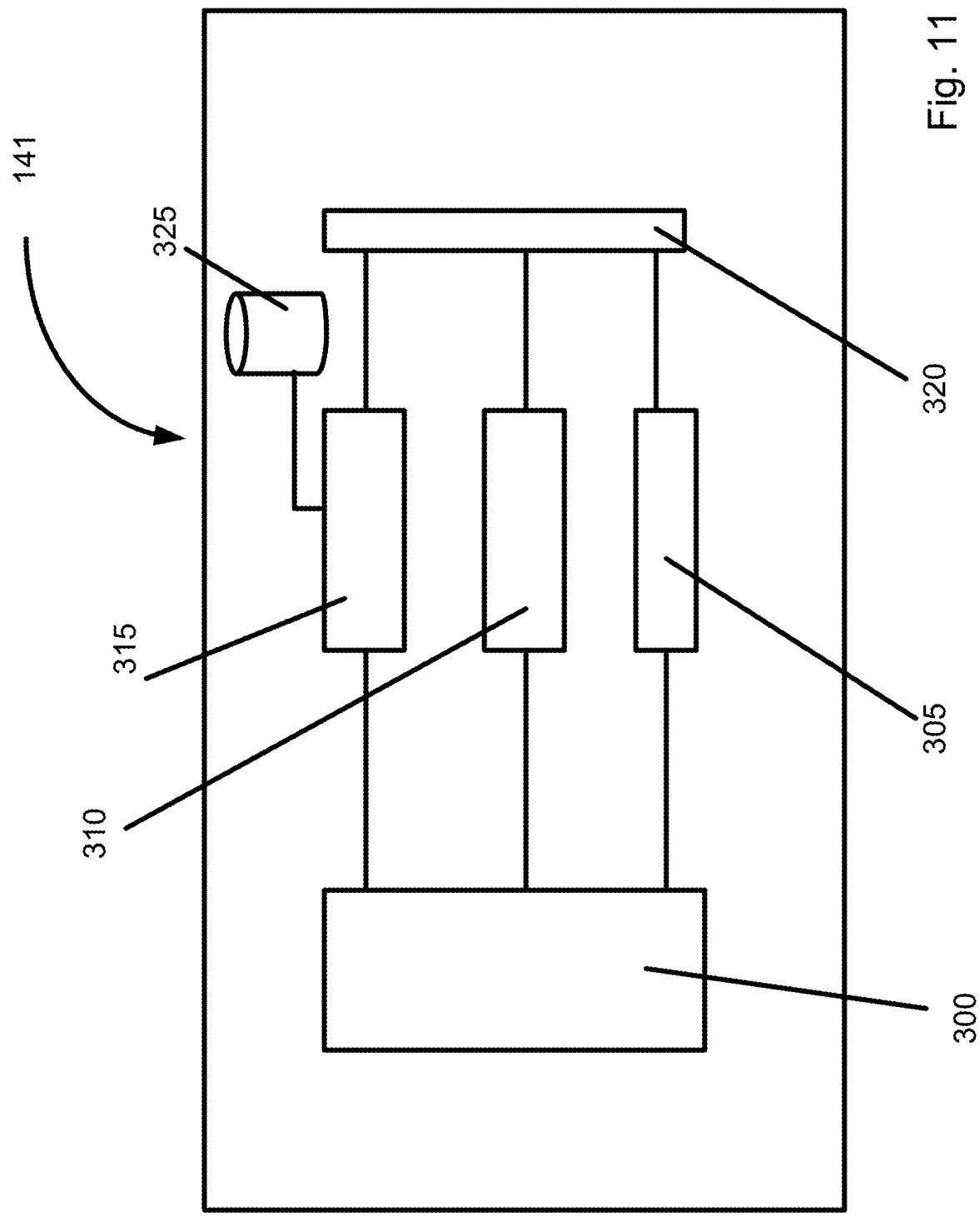
FIG. 11 is an illustration of a server type computing device.

The physical elements that make up the remote computing device 141 may be further illustrated in FIG. 11. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315. Memory described herein may be non-transitory and may be configured to store computer executable instructions that, when executed by at least one processor, cause at least one processor, device, computer, and the like to perform the functions described herein.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of portable computing devices 141 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A display device for providing at-shelf consumer feedback, the display device comprising:
an enclosure;
one or more processors housed within the enclosure;
a display screen disposed on the enclosure, the display screen being in communication with the one or more processors;
a plurality of physical input buttons disposed on the enclosure adjacent to the display screen, the plurality of input buttons being in communication with the one or more processors;
a memory; and
a battery housed within the enclosure, the battery being configured to supply power to the display screen, the one or more processors, and the memory,
wherein the memory contains processor-executable instructions that, when executed by the one or more processors, cause the display device to:
display questionnaire data and answer data on the display screen, the answer data including a plurality of answer selections to the questionnaire data, the answer data being displayed on the display screen such that one of the plurality of answer selections is displayed adjacent to a corresponding one of the plurality of input buttons;
receive a plurality of selected answers from a plurality of users in response to the questionnaire data, each selected answer being selected by each of the plurality of users from the plurality of answer selections via the corresponding one of the plurality of input buttons adjacent to the selected answer;
execute a timing operation to prevent receiving repeated selected answers within a predetermined amount of time;
aggregate the received plurality of selected answers from the plurality of users; and
display the aggregated received selected answers from the plurality of users on the display screen in response to receiving the selected answer.

2. The display device of claim 1, wherein the questionnaire data and the answer data are associated with a product that is located in close proximity to the enclosure.

3. The display device of claim 1, the memory further comprising instructions to display a last of the received selected answers on the display screen.

4. The display device of claim 1, the memory further comprising instructions to select an image for the display screen to display based on the aggregated received selected answers.

5. The display device of claim 4, wherein the image is selected for display based on a ranking derived from the aggregated received selected answers.

6. An at-shelf consumer feedback display system comprising:
an enclosure including an input portion and a display portion, the enclosure including at least one processor;
a display screen disposed in the display portion of the enclosure, the display screen being in communication with the at least one processor;
a plurality of physical input buttons disposed on the input portion of the enclosure, the plurality of input buttons being adjacent to the display screen and in communication with the at least one processor;
a non-transitory computer readable medium; and
a battery housed within the enclosure, the battery being configured to supply power to the display screen, the one or more processors, and the non-transitory computer readable medium,
wherein the non-transitory computer readable medium stores computer executable instructions that, when executed, cause the at least one processor to perform:
display questionnaire data and answer data on the display screen, the answer data including a plurality of answer selections to the questionnaire data, the answer data being displayed on the display screen such that one of the plurality of answer selections is displayed adjacent to a corresponding one of the plurality of input buttons;

receive a plurality of selected answers from a plurality of users in response to the questionnaire data, each selected answer being selected by each of the plurality of users from the plurality of answer selections via the corresponding one of the plurality of input buttons adjacent to the selected answer;

execute a timing operation to prevent receiving repeated selected answers within a predetermined amount of time;

aggregate the received plurality of selected answers from the plurality of users; and display the aggregated received selected answers from the plurality of users on the display screen in response to receiving the selected answer.

7. The at-shelf consumer feedback display system of claim 6, wherein the questionnaire data and the answer data is associated with a product that is located in close proximity to the enclosure.

8. The at-shelf consumer feedback display system of claim 6, further comprising instructions to display the last received selected answers on the display screen.

9. The at-shelf consumer feedback display system of claim 6, further comprising instructions to select an image for display on the display screen based on the aggregated received selected answers.

10. The at-shelf consumer feedback display system of claim 9, wherein the image is selected for display based on a ranking derived from the aggregated received selected answers.

11. A method for providing at-shelf consumer feedback, the method comprising:

providing an enclosure including an input portion and a display portion, the enclosure including at least one processor;

providing a display screen in the display portion of the enclosure, the display screen being in communication with the at least one processor;

providing a plurality of physical input buttons on the input portion of the enclosure, the plurality of input buttons being adjacent to the display screen and in communication with the at least one processor;

housing a battery within the enclosure, the battery being configured to supply power to the display screen and the one or more processors;

displaying, by the display screen, questionnaire data and answer data, the answer data including a plurality of answer selections to the questionnaire data, the answer data being displayed on the display screen such that one of the plurality of answer selections is displayed adjacent to a corresponding one of the plurality of input buttons;

receiving a plurality of selected answers from a plurality of users in response to the questionnaire data, each selected answer being selected by each of the plurality of users from the plurality of answer selections via the corresponding one of the plurality of input buttons adjacent to the selected answer;

executing, via the one or more processors, a timing operation to prevent receiving repeated selected answers within a predetermined amount of time;

aggregating, via the at least one processor, the received plurality of selected answers from the plurality of users; and displaying, by the display screen, the aggregated received selected answers from the plurality of users on the display screen in response to receiving the selected answer.

12. The method of claim 11, wherein the questionnaire data and the answer data is associated with a product that is located in close proximity to the enclosure.

13. The method of claim 11, further comprising displaying, by the display screen, the last received selected answer.

14. The method of claim 11, further comprising selecting an image for display by the display screen based on the aggregated received selected answers, wherein the image is selected for display based on a ranking derived from the aggregated received selected answers.

* * * * *